US012754315B2

(12) United States Patent
Korl et al.

(10) Patent No.: US 12,754,315 B2
(45) Date of Patent: Oct. 6, 2026

(54) POSITION MEASUREMENT METHOD, POSITION MEASUREMENT SYSTEMS AND MARKING

(71) Applicant: Hilti Aktiengesellschaft, Schaan (LI)

(72) Inventors: Sascha Korl, Buchs (CH); Peer Schmidt, Lindau (DE); Nitish Kumar, Buchs (CH); Kristian Morin, Buchs (CH); Michael Helmberger, Bludenz (AT)

(73) Assignee: Hilti Aktiengesellschaft, Schaan (LI)

( * ) Notice: Subject to any disclaimer, the term of this patent is extended or adjusted under 35 U.S.C. 154(b) by 767 days.

(21) Appl. No.: 18/032,104

(22) PCT Filed: Oct. 27, 2021

(86) PCT No.: PCT/EP2021/079794
§ 371 (c)(1),
(2) Date: Apr. 14, 2023

(87) PCT Pub. No.: WO2022/096337
PCT Pub. Date: May 12, 2022

(65) Prior Publication Data

US 2023/0400579 A1 Dec. 14, 2023

(30) Foreign Application Priority Data

Nov. 5, 2020 (EP) .................................... 20205916

(51) Int. Cl.
*G01S 17/48* (2006.01)
*G01S 17/42* (2006.01)
*G01S 17/86* (2020.01)

(52) U.S. Cl.
CPC .............. *G01S 17/48* (2013.01); *G01S 17/42* (2013.01); *G01S 17/86* (2020.01)

(58) Field of Classification Search
CPC ... G01S 17/48; G01S 5/12; G01S 5/04; G01S 5/14; G01S 11/04; G01S 13/46;
(Continued)

(56) References Cited

U.S. PATENT DOCUMENTS

2007/0064246 A1 3/2007 Braunecker et al.
2011/0043515 A1 2/2011 Stathis
(Continued)

OTHER PUBLICATIONS

International Searching Authority, International Search Report and Written Opinion in International Application No. PCT/EP2021/079794, mailed Feb. 8, 2022.

*Primary Examiner* — Sanjiv D. Patel
(74) *Attorney, Agent, or Firm* — Leydig, Voit & Mayer, Ltd.

(57) ABSTRACT

A method for repeatedly measuring the position of a construction device on a construction site, wherein a position is measured relative to at least two, the method comprising: a. directly measuring the distances from a position measurement system arranged and/or formed on the construction device to at least two of the markings located in a field of view of the position measurement system and measuring the apparent viewing angles of the at least two of the markings from the position measurement system to carry out a first measurement of the position of the construction device and b. taking a bearing of at least two of the markings from the position measurement system to carry out a second measurement of the position of the construction device.

20 Claims, 4 Drawing Sheets

(58) Field of Classification Search
CPC .... G05D 1/0244; G05D 1/0236; G05D 1/024; G05D 1/027; G05D 1/622; G05D 1/628; G05D 1/637
See application file for complete search history.

(56) References Cited

U.S. PATENT DOCUMENTS

| | | | | |
|---|---|---|---|---|
| 2018/0180740 | A1* | 6/2018 | Shaffer | G05D 1/0236 |
| 2018/0199162 | A1 | 7/2018 | Yamamoto et al. | |
| 2018/0326507 | A1 | 11/2018 | Halvorsen et al. | |

* cited by examiner

POSITION MEASUREMENT METHOD, POSITION MEASUREMENT SYSTEMS AND MARKING

CROSS-REFERENCE TO RELATED APPLICATIONS

This patent application is the U.S. National Stage of International Patent Application No. PCT/EP2021/079794, filed Oct. 27, 2021, which claims the benefit of European Patent Application No. 20205916.8, filed Nov. 5, 2020, which are each incorporated by reference.

FIELD OF THE INVENTION

The invention relates to a method for repeatedly measuring the position of a construction device, for example a mobile power tool, on a construction site. The position of the construction device within the construction site needs to be measured for numerous devices used or usable on construction sites, for example construction robots. In particular, the construction device should be able to measure its own position on the construction site.

To this end, usual construction activities require comparatively high measurement accuracies; in particular, measurement accuracies of the order of 1 cm or less, in particular ranging from 1 to 10 mm, are desirable.

Should the construction device for example move the construction site, the position measurements should be repeated. In this context, high repetition frequencies facilitate particularly fast movements under position control.

The invention is therefore based on the object of offering a method and apparatuses that allow very frequent position measurements for a construction device on a construction site.

This object is achieved by a method for repeatedly measuring the position of a construction device on a construction site, wherein the position is measured relative to at least two, preferably at least three markings, the method comprising the steps of:

a. directly measuring the distances from a position measurement system arranged and/or formed on the construction device to at least two of the markings, preferably to all of the markings located in a field of view of the position measurement system, and measuring the apparent viewing angles of the at least two of the markings from the position measurement system in order to carry out a first measurement of the position of the construction device, and
b. taking a bearing of at least two of the markings from the position measurement system in order to carry out a second measurement of the position of the construction device.

By way of example, the construction device can be a power tool, in particular a mobile power tool, for example a construction robot, preferably a mobile construction robot, or a hand-held power tool. The construction device can be configured to work on a ceiling, a floor and/or a wall of the construction site. It can comprise at least one apparatus for drilling, chiseling, general hammering and/or spraying. It can comprise a traveling mechanism. As an alternative or in addition thereto, it can comprise a flying and/or floating apparatus for a flying and/or floating movement of the construction device. By way of example, the construction device can also be a flying object, preferably an unmanned flying object, for example a drone.

The construction device itself can also be a position measurement system and/or a position marking device, for example comprising a rotary laser, a spot laser and/or a line laser.

The construction site can be a building-construction construction site or a civil engineering construction site.

In this case, the invention is based on the concept of being able to arrive at higher repetition frequencies by changing the measurement processes for measuring position. In particular, what is exploited is that a direct distance measurement in conjunction with measurements of the viewing angles allows reference positions to be assigned to the markings in a particularly precise manner. This first position measurement can be carried out once. To be able to obtain a high measurement accuracy it is therefore also possible to use comparatively time-consuming measurement processes, for example time of flight-based measurement processes, for the direct distance measurement.

Then, by taking a bearing of the markings while taking account of the ascertained reference positions, it is possible to use a comparatively fast measurement process, in particular for subsequent, repeated position measurements. As a result, the subsequent position measurements can be accelerated significantly, and so repeated, very frequent position measurements can be made for a construction device on a construction site.

A direct distance measurement can be understood to mean a measurement by means of a length meter, in particular a measurement without triangulation. A direct measurement can be carried out, e.g., in mechanical fashion, for example by means of a tape measure or the like, or in optical fashion, for example by means of a light beam.

For measurement purposes, the distance between two measurement points can be bridged, for example in mechanical or optical fashion. By way of example, it is possible to measure the time-of-flight of a light beam along the distance or along twice the distance, that is to say for both an outward and return leg along the distance.

Such direct measurements offer the advantage of the intermediate distance being ascertainable directly therewith, in particular without knowledge of reference positions or reference paths or the like. However, as a rule these are comparatively slow and therefore offer only low repetition frequencies. Depending on the specific measurement method utilized, there may also be comparatively significant outlay in terms of evaluation and/or calculations, which in turn limits the achievable repetition frequencies.

Taking a bearing can be understood to be a measuring method which only requires angle measurements in relation to reference paths or the reference positions known in advance.

Two-dimensional measurements often suffice for position measurements on construction sites. It is therefore conceivable to measure or use only two markings. However, to improve the accuracy it is also conceivable to use more than two markings, for example three, four or five markings. If more than two markings are used, it is also possible to implement at least one three-dimensional position measurement. To improve the accuracy, the markings can be spaced apart from one another, for example spaced apart by distance of at least 1 m from one another in each case.

The position measurement system is arranged and/or formed on the construction device and can therefore be moved together with the construction device. The position can then be determined from the construction device and, in particular, not from a possible third device, for example a separately set up automatic total station. Continuous visual contact with such a third device, which especially on construction sites can often only be maintained with difficulties, is not required.

By way of example, the direct measurement of the distances can be implemented by means of a laser rangefinder or time of flight (TOF) camera. The direct measurements of the distances can also be implemented by means of a camera, for example using a simultaneous localization and mapping (SLAM) algorithm.

For the contactless measurement of the distances and/or for the measurement of at least one angle it is possible for an electromagnetic beam, in particular a laser beam, to be emitted, preferably by the position measurement system. The electromagnetic beam can be a microwave beam, a radar beam, an infrared beam, a light beam from the visible spectrum, a UV light beam or the like. For measurement purposes, use can be made of a beam rangefinder, for example a laser rangefinder.

The laser rangefinder can be and/or comprise a lidar, an abbreviation for “light detection and ranging”. The lidar can be formed and/or arranged on the position measurement system.

If an intensity sensor for measuring an intensity of a reflection of the beam is used during the measurement of the distances and/or the viewing angles and/or when a bearing is taken, time series can also be recorded in a particularly cost-effective manner. In general, intensity sensors can measure comparatively cost-effectively but nevertheless have a high temporal resolution with a high geometric resolution at the same time. Additionally, at least one of the markings can be identified by the evaluation of such a time series.

To further increase the measurement accuracy it is possible to use an inertial measurement unit (IMU) and/or an angle encoder. This is particularly recommended when measuring the viewing angles and/or when taking a bearing.

By way of example, the angle encoder can capture a respective beam direction of the beam. The inertial measurement unit can be configured to capture acceleration forces, for example the gravitational force, of the construction device and/or the position measurement system. This additional information can be used for an advance calculation of expected position information and/or for determining a relative position and/or alignment of the construction device.

If the beam is rotated in a horizontal or at least substantially horizontal plane, preferably through 360°, it is possible to capture the field of view around the position measurement system or around the construction device by means of a single beam. This can increase the options for placing the markings, in particular within the field of view of the position measurement system. Likewise, it is possible to extend the region within which the construction device can be placed so that the position of the construction device is or remains determinable by means of the position measurement system.

A variant of the method according to the invention can comprise a search step in which the at least two markings are searched for within the construction site by means of the position measurement system, in particular by means of the intensity sensor. The search can be implemented by virtue of the beam being rotated, in particular through 360°, with the intensities of reflections of the beam being measured. In particular, it is conceivable to detect markings on the basis of their reflection properties in relation to the beam. For the search, the beam can be rotated in a horizontal or at least substantially horizontal plane. It is conceivable to vary the height position of the plane, particularly if no marking can be detected during a revolution of the beam. There can be a vertical deflection of the beam to this end, for example by means of a vertical deflection unit. The extent of the vertical deflection can be varied such that the searched search field extends over a band extending in the vertical direction.

It is conceivable for the markings used to this end to have characteristic reflection properties, in particular characteristic reflection patterns.

By way of example, they can have a marking area with a stripe pattern.

Preferably at least one of the markings can have a height of at least 30 cm. This can reduce the demands on the positioning accuracy of the vertical deflection unit and the elevations at which the markings are arranged need not correspond.

The scope of the invention further includes a position measurement system configured to carry out the method according to the invention, comprising a direct rangefinder unit for directly measuring a distance between the position measurement system and a marking, a viewing angle measurement unit for measuring an apparent viewing angle of the marking from the position measurement system, and a bearing unit for taking a bearing of the marking. Such a position measurement system facilitates the exploitation of the advantages according to the method, in particular it allows multiple position measurements of the construction device at a comparatively high repetition frequency. In this case, one or more of the units can be embodied as a unified element and/or be part of one of the other units. It is also conceivable for at least two of the units to use individual elements thereof together. By way of example, the rangefinder unit can be a lidar and can comprise a laser beam source and a horizontal deflection unit. The laser beam source and/or the horizontal deflection unit can also be used by the bearing unit and/or else be part of the bearing unit.

It is also conceivable for the bearing unit to have a camera system. The camera system can be configured for optical image processing. In particular, it can be configured to recognize the marking in an image recorded by the camera system and/or to determine an apparent angle of the marking from the position measurement system, for example relative to an internal coordinate system, in particular a body-own coordinate system related to the position measurement system and/or the construction device.

In one variant of the method and also for an independent method for measuring the position of a construction device in the form of a mobile power tool, provision can be made for at least one position to be determined by means of mechanical contact with a surface region of a construction element of the construction site. The independent method can also have one or more of the features described above or below.

The construction element can be a concrete element, for example made of reinforced concrete. Alternatively, it can also be a construction element made of metal. Further materials are likewise conceivable. The construction element can be and/or comprise a wall, a floor and/or a ceiling.

Construction work to be carried out is often stored in a BIM (building information model) model. Such a BIM model can be embodied in the form of CAD data, construction descriptions, data lists, drawings and/or other forms of planning data.

Positions in the BIM model are assigned to the construction works, to which positions real positions on the construction site have to be assigned in order to realize the respective construction work at the respectively suitable position. However, there often are deviations between a plan as per the BIM model and the actual position of already erected construction elements or the like.

Then, other construction work frequently also needs to be adapted as a consequence of such a deviation. By way of example, the position of a drilled hole in a wall should, as a rule, be determined relative to the position of the wall and/or relative to another position, for example another drilled hole, of the wall. This should even apply if the wall overall is arranged with an offset relative to an initial point of the construction site and/or relative to a construction site-related coordinate system with a greater or lesser deviation from the plan as per the BIM model.

To therefore compensate such deviations it is possible to ascertain an actual position by means of the mechanical contact. It is possible to ascertain the relative position of this mechanical contact in relation to the at least two markings. By way of example, it is possible to ascertain the distances between the mechanical contact and the at least two markings. In general, it is possible to ascertain a deviation of the position of the mechanical contact relative to the at least two markings and correspondingly planned positions as per the BIM model. Subsequent determinations of position can be corrected for by the ascertained deviation.

The mechanical contact can be established between the construction device and the surface region. To this end, the construction device can comprise a manipulator. The manipulator can be embodied in the form of an arm, in particular a multiple axis arm, for example with at least three and preferably at least six degrees of freedom. It can have an end effector. The end effector can have a power tool fitting, in particular for receiving an electrical power tool and/or a measurement sensor. The mechanical contact can then be established directly and/or indirectly between the manipulator and the surface region. To this end, the mechanical contact can be between, for example, a device received in the power tool fitting and the surface region and/or can be detected by the device and/or the construction device.

The position of the mechanical contact can correspond to the position of surface work on the surface region, in particular surface work that has taken place or will take place.

By way of example, the surface work can be and/or comprise drilling, cutting, chiseling, grinding and/or reshaping. It can also comprise a creation of the surface region, for example by pouring and/or stacking construction material.

Consequently, it is conceivable in an exemplary fashion to mechanically contact the construction element, for example a wall, a ceiling and/or a floor, at one position. By way of example, a drilled hole can be drilled into the construction element at the position. Then, for the purposes of determining further positions, this position can be used as actual position of the drilled hole. In particular, it is possible to ascertain a deviation of the actual position from a target position as per the BIM model.

The mechanical contact can also be established by virtue of the construction device whose position should be measured coming into mechanical contact with the construction element on the construction site, for example during a movement of the construction device. The construction device can comprise a contact sensor for the purposes of detecting such a mechanical contact.

It is also conceivable for the construction device to mechanically contact construction elements of the construction site at one or more test positions on the construction site. In particular, it is conceivable for the one or more test positions to be honed in on by means of the construction device, in each case until mechanical contact is established. Then, it is possible for example to capture deviations and/or correspondences with the BIM model in each case.

Consequently, an additional method feature and a method for quality control on a construction site also arise, within the scope of which at least one test position, preferably a plurality of test positions, of the construction site are honed in on by the construction device and a mechanical contact is established with a surface region, comprising the respective test position, of a construction element of the construction site. Further, the respective position of the respective mechanical contact can be determined, for example according to one of the above-described methods or methods described below. The respectively determined position can be compared to a corresponding position as per a BIM model. It is possible to ascertain deviations and/or correspondences between the respectively determined position and the corresponding position.

A further method feature and a further method moreover also arise by virtue of a position on a construction site being determined by virtue of mechanical contact with a surface region being detected and/or established, and with at least one further sensor signal being used to determine the position of the position on the construction site. By way of example, the further sensor signal can correspond to a distance value ascertained by means of a laser beam, and/or a bearing. A plurality of measurement values for the position on the construction site emerging from these measurements can be compared to one another. By way of example, the comparison can be implemented by means of a Kalman filter.

The scope of the invention also includes a position measurement system for repeatedly measuring the position of a construction device, on which the position measurement system is arrangeable, formable, arranged and/or formed, on a construction site, for example on a building-construction construction site or on a civil engineering construction site, wherein the position is measurable relative to at least two, preferably at least three markings, the position measuring system comprising a beam source for generating an electromagnetic beam, a horizontal deflection unit for deflecting the beam in a horizontal or in an at least substantially horizontal plane, a beam rangefinder, and an intensity sensor for measuring an intensity of a reflection of the beam generated by the beam source. Such a position measurement system can also be configured to carry out the method according to the invention.

The two variants of position measurement system can have one or more of the physical features described in conjunction with the method. By way of example, the beam source can be a laser. In particular, the position measurement system can comprise a lidar. The position measurement system can also comprise a vertical deflection unit. The position measurement system can also comprise an angle encoder. The beam source can form part of the beam rangefinder.

In a further, particularly preferred embodiment of the invention the position measurement system has a zero-passage sensor. The zero-passage sensor can be configured to detect a zero passage of the beam during its rotation. Hence, it can be configured as a sensor for capturing the rotational frequency of the beam.

The time elapsed since the respective last zero passage can be a zero of an internal coordinate system or at least one axis of the internal coordinate system.

The position measurement system particularly preferably comprises a camera system. The camera system can be configured to measure third position measurements simultaneously with, substantially simultaneously with or with a time offset from the first and/or second position measurements. To this end, a SLAM algorithm can be implementable and/or implemented in the camera system and/or in a computer system connected to the camera system, for example.

Moreover, the invention provides a mobile construction device for construction site, in particular for a building-construction construction site and/or civil engineering construction site, for example a construction robot, a hand-held power tool or a construction measuring device, comprising a position measurement system according to the invention. The mobile construction device can comprise and/or be at least one of the above-described construction devices.

Moreover, the invention provides a marking for use within the scope of a method according to the invention and/or for use with a position measurement system according to the invention.

The marking comprises a measurement area which is configured to reflect an electromagnetic beam of the position measurement system. The reflection can be matt or shiny. The reflectance in the region of the measurement area can be higher than that of surfaces, in particular of all surfaces, outside of the measurement area. In particular, the measurement area can have a gray, in particular a light gray, or a white hue. Such a hue can diffusely reflected a comparatively large proportion of scattered-in light. It is also conceivable for the measurement area to have a reflecting surface.

Particular preferably, the marking can have at least one marking area. The marking area can differ from the measurement area. The marking area can have a stripe pattern. The reflectance can vary within the stripe pattern. The stripe pattern can be designed to run vertically or at least substantially vertically, at least in accordance with the usual direction of use for the marking. There can be a plurality of marking areas, in particular an upper and a lower marking area in accordance with the usual direction of use for the marking.

Consequently, the marking can have a sandwich-like pattern. The measurement area and/or the marking area can have a stripe pattern with a vertically varying stripe density and/or stripe width. This can simplify the identification of markings. Depending on the design of the marking, more particularly of the marking area and of the measurement area, it is also possible to derive information regarding the region or the point in which the beam strikes the marking from the intensity of the reflected light of the beam.

A particularly preferred embodiment of the marking has a cylindrical form. As a result, the marking can be identified and used from particularly many directions.

The height of the marking can be greater than its width, in particular greater than the largest diameter of the marking. Here, the height and the width can be measured in accordance with the usual direction of use for the marking.

By way of example, the marking can have a height of at least 30 cm. Particularly preferably, the measurement area can have a height of at least 10 cm. This can reduce the demands on the positioning accuracy of the vertical deflection unit and the elevations at which the markings are arranged need not correspond.

Further features and advantages of the invention emerge from the following detailed description of exemplary embodiments of the invention, with reference to the figures of the drawing, which shows details essential to the invention, and from the claims. The features shown there are not necessarily to be understood as true to scale and are shown in such a way that the special features according to the invention can be made clearly visible. The various features can be implemented individually in their own right or collectively in any combination in variants of the invention.

In the schematic drawing, exemplary embodiments of the invention are shown and explained in more detail in the following description.

In the figures.

In order to make it easier to understand the invention, the same reference signs are used in each case for identical or functionally corresponding elements in the following description of the figures.

Figure 1:
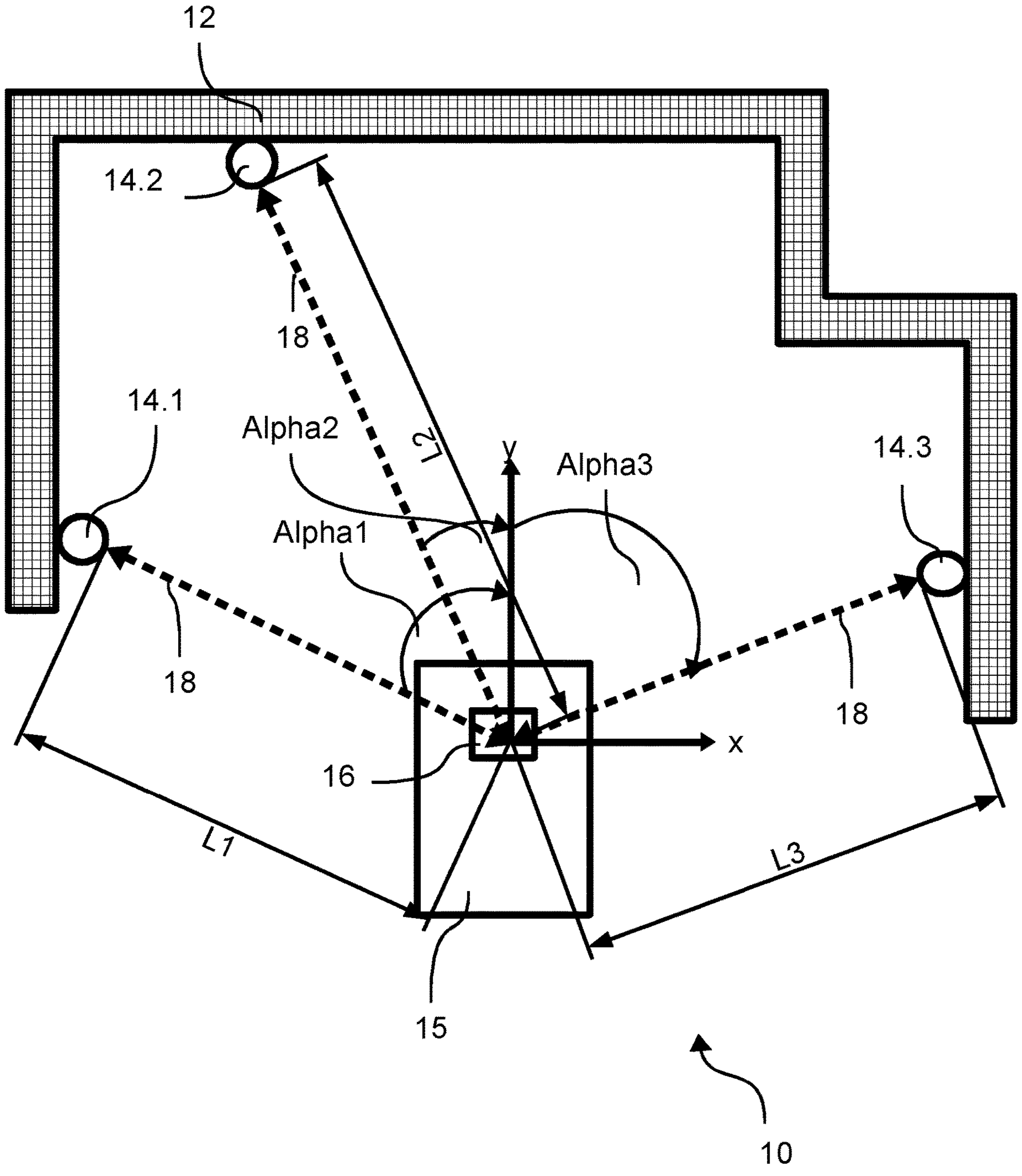
FIG. 1 shows a schematic view of a construction site from above, with a position measurement system arranged on a construction device.

FIG. 1 shows a building-construction construction site 10 with a building wall 12. Three markings 14.1, 14.2 and 14.3 are arranged on the building wall 12.

A construction device 15, on which a position measurement system 16 is arranged, is situated on the building-construction construction site 10. The construction device 15 is a mobile construction robot. The mobile construction robot can be configured to work on floors, ceilings and/or walls, in particular for working on the building wall 12. In particular, it can be designed for drilling and/or chiseling.

A laser beam 18 is emitted by the position measurement system 16. The position measurement system 16 rotates the laser beam 18 in a horizontal plane level with the markings 14.1, 14.2 and 14.3 through a total of 360°.

Figure 3:
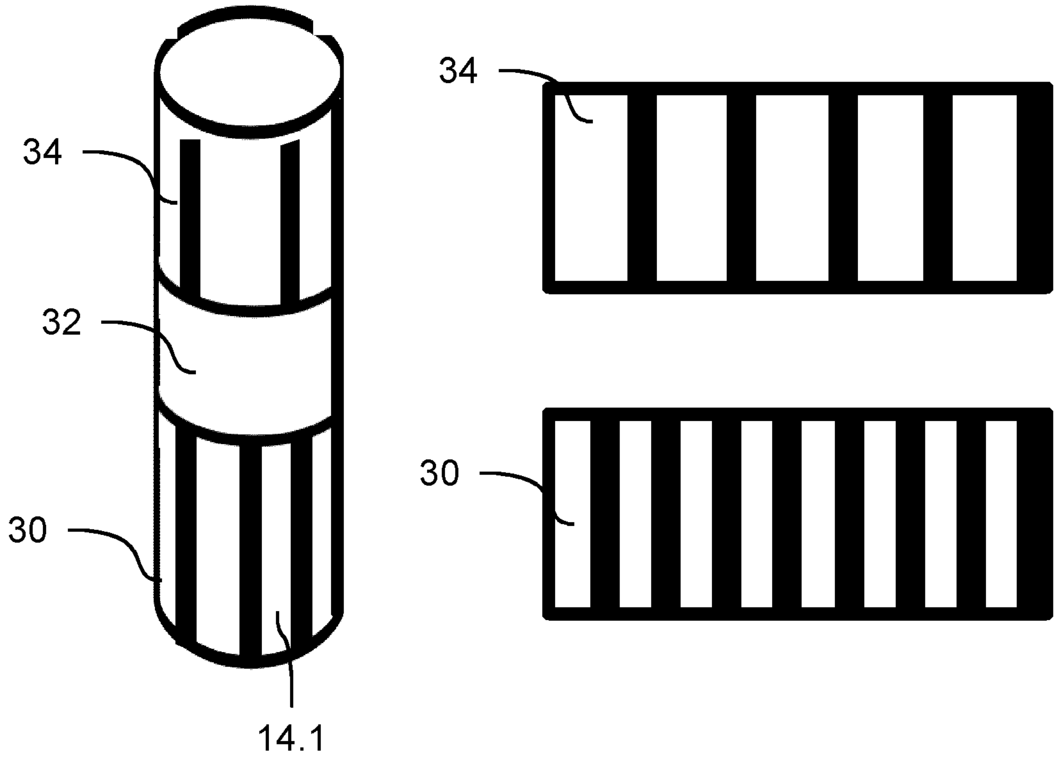
FIG. 3 shows a schematic illustration of the marking and rolled-open illustrations of surface regions of the marking.

FIG. 3 illustrates three situations, in which the laser beam 18 in each case strikes one of the markings 14.1, 14.2, 14.3 during its rotation. In these situations, the position measurement system 16 determines the distances between the position measurement system 16 and the markings 14.1, 14.2 and 14.3 as the distances L1, L2 and L3. The position measurement system 16 in each case measures viewing angles Alpha1, Alpha2 and Alpha3 relative to an internal, body-own coordinate system with axes X and Y, at which angles the markings 14.1, 14.2 and 14.3 are respectively visible from the position measurement system 16.

Figure 4:
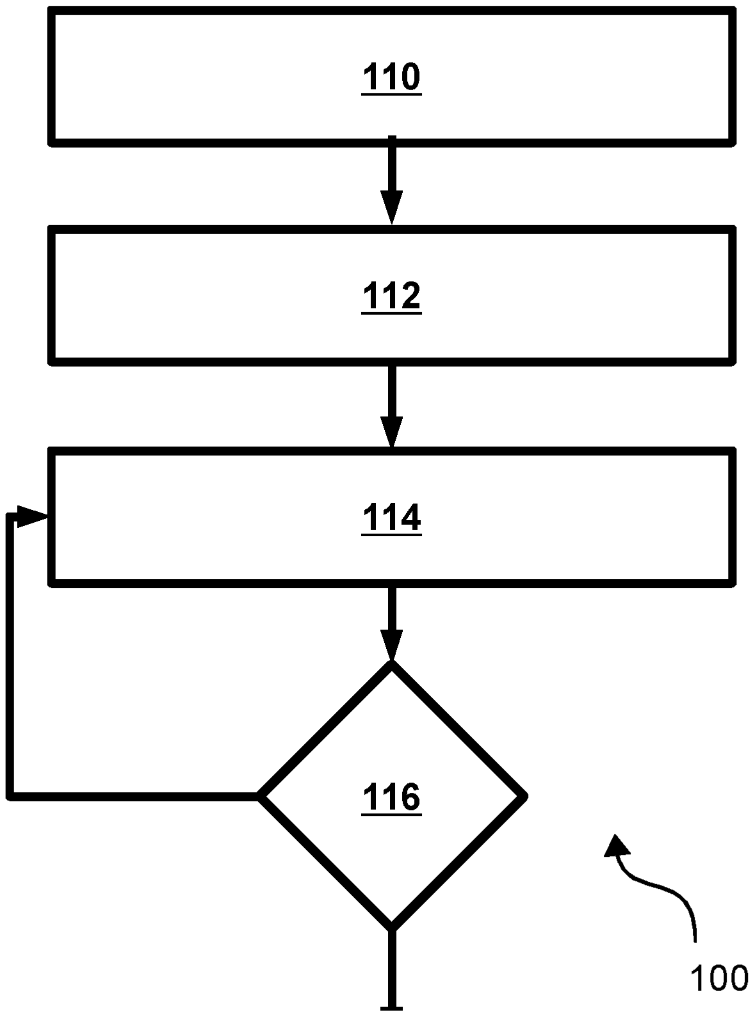
FIG. 4 shows a flowchart of the method.

As will still be explained in more detail in the context of FIG. 4, FIG. 1 consequently represents positions at which the position measurement system 16 carries out measurements of the distances L1, L2 and L3 and of the viewing angles Alpha1, Alpha2 and Alpha3 in accordance with step a of the method according to the invention.

Figure 2:
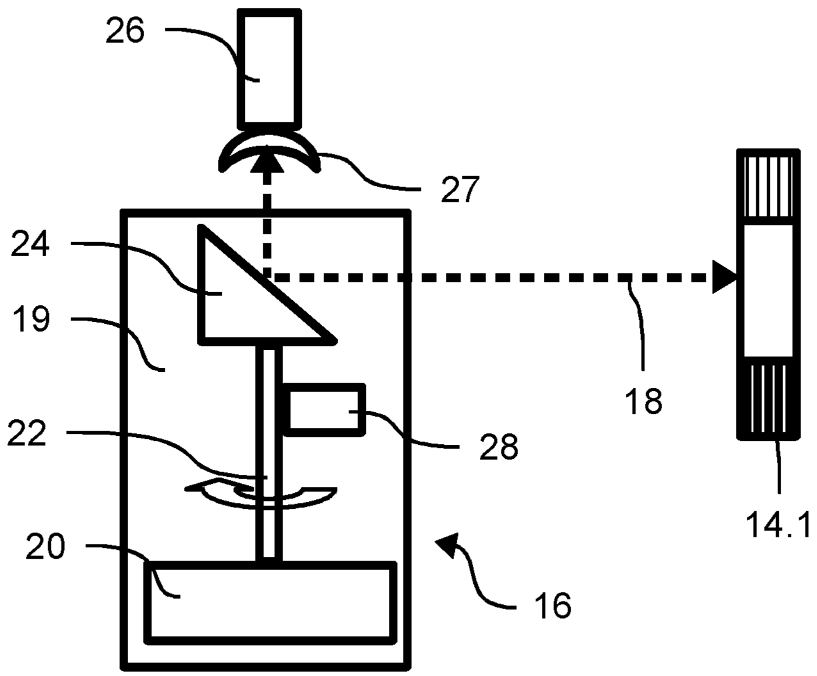
FIG. 2 shows a schematic illustration of the position measurement system.

FIG. 2 schematically shows the structure of the position measurement system 16.

It comprises a horizontal deflection unit 19 with a motor 20, for example a spindle motor, a spindle 22, a prism mirror 24 and an angle encoder 28. The motor 20 puts the spindle 22 into rotation. The prism mirror 24 is arranged on the spindle 22. Consequently, the prism mirror 24 co-rotates with the spindle 22, in a manner driven by the motor 20. It deflects a laser beam 18, which is generated and emitted by a beam source 26, in a horizontal plane.

The prism mirror 24 is vertically adjustable. In particular, the laser beam 18 can be deflected vertically to a different extent depending on the position of the prism mirror 24. It consequently forms a vertical deflection unit for the laser beam 18.

A sensor unit 27 comprises an intensity sensor for capturing intensities of reflected light from the laser beam 18 and a beam rangefinder in the form of a time-of-flight measurement unit for capturing an outward and return time of flight of the laser beam 18. In particular, the beam source 26, the beam rangefinder and the horizontal deflection unit 19 form a lidar.

The laser beam 18 generated by the beam source 26 strikes the markings 14.1 or 14.2 (FIG. 1) or 14.3 (FIG. 1) in accordance with the situations illustrated in FIG. 1 and is reflected back from the respective marking 14.1, 14.2 or 14.3 to the prism mirror 24 and subsequently to the sensor unit 27. In this respect, the marking 14.1 is depicted in a schematic side view in FIG. 2 in exemplary fashion.

The sensor unit 27 captures the intensity of the back-reflected light and also the overall time of flight, and hence the total distance traveled by the laser beam 18.

It goes without saying that the sensor unit 27 is also capable of being driven and utilized in such a way that only one of the two measurement variables is captured. In particular, the sensor unit 27 can be designed to only capture the intensity of the back-scattered light.

The angle encoder 28 is configured to capture a rotation angle of the spindle 22 and hence of the prism mirror 24, and hence in turn to capture a rotation angle of the beam direction of the laser beam 18. Here, the direction of the Y-axis (FIG. 1) is chosen as a zero of the captured angle.

The beam rangefinder forms a direct rangefinder unit. A viewing angle measurement unit and a bearing unit are formed by the beam source 26, the sensor unit 27, the horizontal deflection unit 19 and the angle encoder 28.

FIG. 3 shows the marking 14.1. Markings 14.2 and 14.3 (both in FIG. 1) have an identical embodiment to marking 14.1.

From a perspective view on the left-hand side of FIG. 3 it is possible to identify that the marking 14.1 has a cylindrical embodiment. It has three portions on its circumferential outer side. In particular, it has a lower marking area 30 and an upper marking area 34, which surround a measurement area 32 situated therebetween from above and below in sandwich-like fashion.

As is identifiable, in particular also on the basis of the right half of the illustration as per FIG. 3 which shows the rolled-open illustrations of the portions, the upper marking area 34 and the lower marking area 30 each have a stripe pattern. The stripe patterns have vertically extending stripes in accordance with the usual direction of use for the marking 14.1. In particular, it is possible to recognize that the stripes of the stripe pattern of the marking area 30 are chosen to be closer together than the stripes of the marking area 34.

If the laser beam 18 (FIG. 1) consequently sweeps over the marking 14.1 in the region of the upper marking area 34, the temporal intensity curve of the back-reflected light from the laser beam 18 has a low frequency rhythm, whereas a higher frequency rhythm of the intensity curve is measurable in the case where the laser beam 18 sweeps over the lower marking area 30. In this case, light/dark contrasts detected during the sweep are chosen in terms of their amplitude and their rhythms such that it is possible to distinguish the marking 14.1 from other surfaces of the construction site 10 (FIG. 1) with a sufficient reliability.

If the laser beam 18 sweeps over the measurement area 32, light is reflected back with a comparatively high intensity but without a rhythmic modulation, and can be detected as a result. The detection can still be improved in respect of its spatial resolution by virtue of for example an intensity maximum of the reflected light being ascertained for the purposes of localizing the marking 14.1.

Now, the method according to the invention should be explained on the basis of a method 100, with reference being made to FIG. 4.

To simplify the understanding of the method 100, the reference signs introduced above are resorted to for the purposes of describing elements of the position measurement system and other above-described elements.

In a search step 110, the markings 14.1, 14.2 and 14.3 are initially searched or localized within the construction site 10 in accordance with the aforementioned search step of the method.

To this end, the laser beam 18 is put into rotation and vertically deflected by means of the prism mirror 24. The vertical deflection can be implemented in steps, in particular comparatively coarse steps corresponding to the height of the markings 14.1, 14.2 and 14.3.

If the laser beam 18 strikes one of the markings 14.1, 14.2 and 14.3 in the process, it is possible to finely adjust the vertical deflection of said laser beam. To this end, the portion in which the laser beam 18 is incident can be deduced from the frequency of the back-reflected light. Depending on whether it strikes the upper or the lower marking area 30, for example, the beam is deflected further up or further down by means of the prism mirror 24 until it ultimately strikes the measurement areas 32 of the markings of 14.1, 14.2 and 14.3.

For a first position measurement, the distances L1, L2 and L3 and the viewing angles Alpha1, Alpha2 and Alpha3 are measured by means of the sensor unit 27 in a step a of the method, depicted in a step 112 in FIG. 4. In particular, the viewing angles Alpha1, Alpha2 and Alpha3 are measured relative to the body-own coordinate system with the axes X and Y. Here, the Y-axis, which corresponds to a conventional forward direction of the construction device 15, is defined as the zero-crossing direction.

The distances L1, L2 and L3 are measured by way of time-of-flight measurement, i.e., a TOF measurement, of the time of flight of the laser beam 18 from the sensor unit 27 to the respective markings 14.1, 14.2 and 14.3, respectively, and back to the sensor unit 27.

The angle measurements are implemented by means of the angle encoder 28, wherein the angle taken by the laser beam 18 for the respective intensity maximum of the back-reflected light is classified as the viewing angle Alpha1, Alpha2 or Alpha3 in each case.

Distances and relative positions of the markings 14.1, 14.2 and 14.3 with respect to one another can also be ascertained from the obtained data.

As a rule, this first position measurement is implemented once within a sequence of a plurality of position measurements.

Further position measurements are subsequently implemented as per step b of the method 100 described below, said step comprising a step 114 as per FIG. 4.

The second position measurements can be carried out repeatedly, in particular when the construction device 15 is moved from one location to another location on the construction site 10.

These second position measurements are implemented by taking a bearing of the markings 14.1, 14.2 and 14.3.

To this end, the laser beam 18 is once again rotated, in particular through 360°, from the position measurement system 16.

The respective apparent angles of the markings 14.1, 14.2, 14.3 in relation to the position measurement system 16 are captured in each case on the basis of the intensity maxima of the back-reflected light and by means of the angle encoder 28.

Under the assumption that the markings 14.1, 14.2 and 14.3 are arranged in stationary fashion on the construction site 10 it is consequently possible in each case to ascertain the position of the position measurement system 16, and hence of the construction device 15, by means of triangulation.

Preferably, the rotational speed of the laser beam 18 is increased during these second position measurements in comparison with the determinations of the position as per step a or 112, for example increased to twice the rotational speed.

As an alternative to the rotation of the laser beam 18, it is also conceivable to merely steer the laser beam 18 within a corridor, in particular within a circular sector. It is also conceivable to use a plurality of laser beams, especially those generated by more than one beam source, for example. An alternative in which the laser beam 18 is switched to different regions or circular sectors is also conceivable. By way of example, the switchover can likewise be implemented by means of the prism mirror 24 and/or a switchable liquid crystal layer.

Thereupon, a check is carried out in a final step 116 as to whether position measurements should be taken. By way of example, it is possible to this end to check whether the construction device 15 has come to rest or is continuing with its movement. In the case of further position measurements, step 114 of the method 100 is repeated again so that further second position measurements are carried out.

Otherwise, the method 100 is terminated.

It is understood that after one or more position measurements in each case, the respective measurement result can be transferred to a further unit, in particular to a further unit of the construction device 15, for further use.

Figure 5:
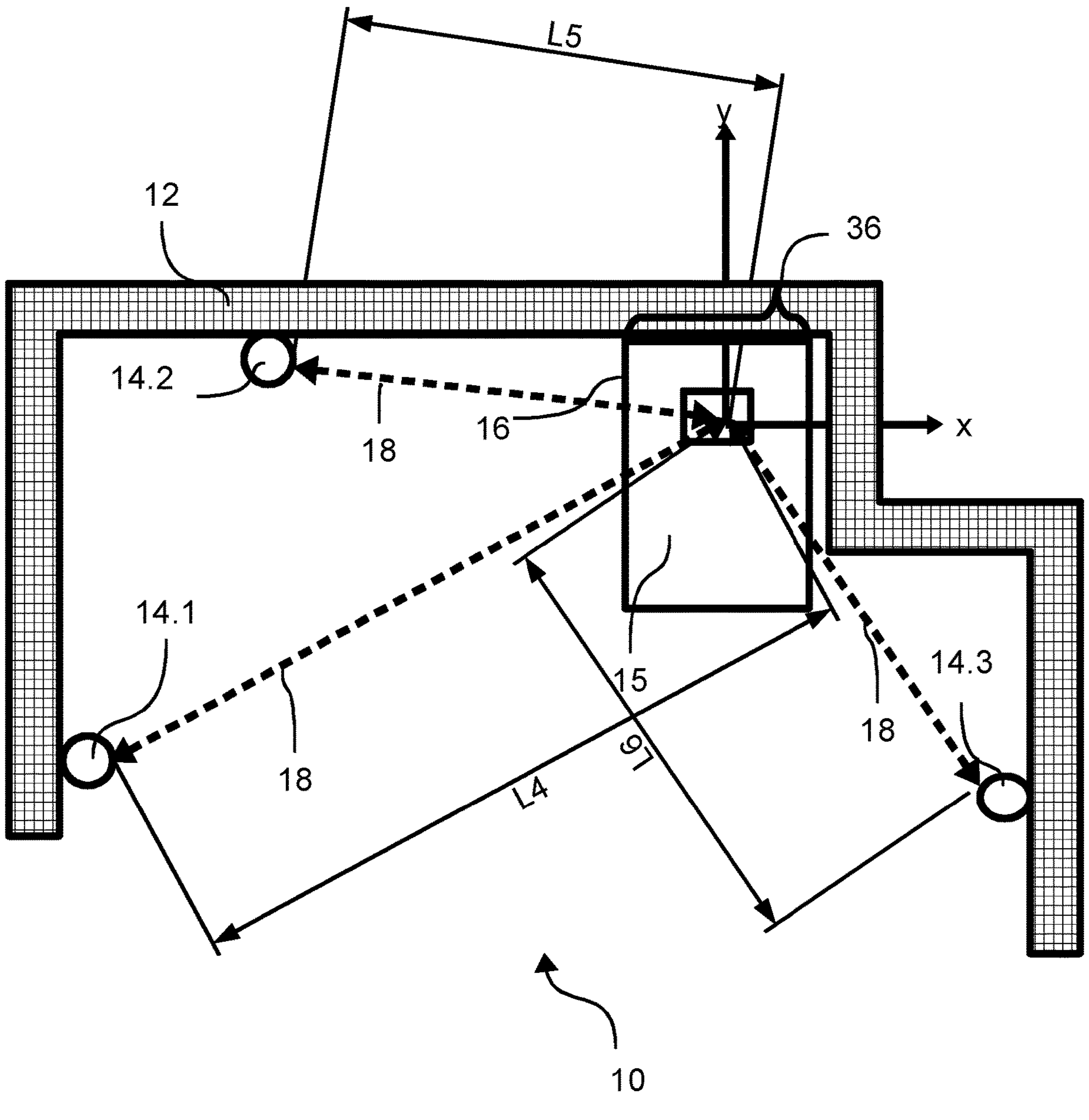
FIG. 5 shows a schematic view of the construction site as per FIG. 1, wherein the construction device is in mechanical contact with a building wall.

FIG. 5 shows a schematic view of the construction site 10 as per FIG. 1, in which the construction device 15 is located at a different position in comparison with the situation as per FIG. 1.

In particular, the construction device 15 is in mechanical contact with the building will 12 in a surface region 36 of the building wall 12 represented schematically by way of a bracket.

The construction device 15 can comprise a contact sensor in order to detect that the construction device 15 is in mechanical contact with the building wall 12.

Once the construction device 15 has detected the mechanical contact with the building wall 12, distances L4, L5 and L6 to the markings 14.1, 14.2 and 14.3 are measured by means of the rotating laser beam 18. By way of example, this can be implemented in a manner analogous to the procedure described in relation to FIG. 1.

From this, a position of the surface region 36 is determined taking account of the dimensions and/or the geometry of the construction device 15.

The position of the surface region 36 can now be used to determine further absolute positions and/or relative positions, and/or to determine position correction values.

By way of example, if a target position of the surface region 36 and positions of the markings 14.1, 14.2 and 14.3 are known within a BIM model, it is possible to ascertain a deviation value as a difference between the measured distances L4, L5, L6 and the distances expected as per the BIM model. Further position measurements, for example according to the above-described method, can be corrected by the deviation value ascertained thus.

It is also conceivable for such an ascertainment of a deviation value to be implemented more than once. By way of example, a further deviation value can be ascertained in the case of further mechanical contact in the same surface region 26 or with a different surface region of the same construction element, the building wall 12 in this case, or in the case of mechanical contact with another construction element.

It is also conceivable to replace one or more distance measurements to one or more of the markings 14.1, 14.2, 14.3 or optionally further markings by virtue of using the position of the mechanical contact instead of the position of the relevant marking or markings. In this case, it is possible to dispense with a measurement of the distance to the position of the mechanical contact by means of the laser beam 18.

LIST OF REFERENCE SIGNS

10 Construction site
12 Building wall
14.1 Marking
14.2 Marking
14.3 Marking
15 Construction device
16 Position measurement system
18 Laser beam
19 Horizontal deflection unit
20 Motor
22 Spindle
24 Prism mirror
26 Beam source
27 Sensor unit
28 Angle encoder
30 Marking area
32 Measurement area
34 Marking area
36 Surface region
100 Method
110 Search step
112 Step
114 Step
116 Final step
Alpha1 Viewing angle
Alpha2 Viewing angle
Alpha3 Viewing angle
L1 Distance
L2 Distance
L3 Distance
L4 Distance
L5 Distance
L6 Distance
X Axis
Y Axis

The invention claimed is:

1. A method for repeatedly measuring position of a construction device on a construction site wherein a position is measured relative to at least two markings, the method comprising a. directly measuring distances from a position measurement system arranged and/or formed on the construction device to the at least two of the markings located in a field of view of the position measurement system, and measuring the apparent viewing angles of the at least two markings from the position measurement system and carrying out a first measurement of the position of the construction device, wherein at least one position of the construction site is determined using mechanical contact of the construction device with a surface region of a construction element of the construction site, wherein a position of the surface region is determined; and b. taking a bearing of the at least two of the markings from the position measurement system and carrying out a second measurement of the position of the construction device, wherein the second measurement is performed at a higher repetition frequency than the first measurement.

2. The method as claimed in claim 1, wherein an electromagnetic beam is emitted, in order to measure the distances and/or to measure at least one of the apparent viewing angles.

3. The method as claimed in claim 1, including using an intensity sensor for measuring an intensity of a reflection of the beam is used when measuring the distances and/or the apparent viewing angles and/or when taking a bearing.

4. The method as claimed in claim 1, including using an inertial measurement unit and/or an angle encoder when measuring the apparent viewing angles and/or taking a bearing.

5. The method as claimed in claim 2, including rotating the beam in a horizontal or at least substantially horizontal plane.

6. The method as claimed in claim 1, comprising a search step in which the at least two markings are searched for within the construction site by the position measurement system.

7. The method as claimed in claim 1, wherein at least one of the markings has a marking area with a stripe pattern.

8. The method as claimed in claim 1, wherein at least one of the markings has a height of at least 30 cm.

9. The method as claimed in claim 1, wherein the apparent viewing angles (Alpha1, Alpha2, Alpha3) and/or angles measured when taking a bearing are measured relative to an internal coordinate system of the construction device.

10. The method as claimed in claim 1, wherein at least one further position measurement is carried out, with a camera system being used.

11. The method as claimed in claim 1, wherein at least one position is determined by mechanical contact with a surface region of a construction element of the construction site.

12. The method as claimed in claim 11, wherein the position of the mechanical contact corresponds to the position of a surface work on the surface region.

13. A position measurement system configured to carry out the method as claimed in claim 1, comprising a direct rangefinder unit for directly measuring a distance between the position measurement system and a marking, a viewing angle measurement unit for measuring an apparent viewing angle of the marking from the position measurement system, and a bearing unit for taking a bearing of the marking.

14. The position measurement system as claimed in claim 13, wherein the position measurement system has a camera system.

15. A mobile construction device comprising a position measurement system as claimed in claim 13.

16. The method of claim 1, wherein the position is measured relative to at least three markings.

17. The method of claim 16, wherein a comprises directly measuring the distances from the position measurement system to all of the markings.

18. The method of claim 2, wherein the electromagnetic beam is a laser beam.

19. The method of claim 5, including rotating the beam through 360° in a horizontal or at least substantially horizontal plane.

20. The method of claim 6, wherein the at least two markings are searched for within the construction site by an intensity sensor.

* * * * *